United States Patent [19]

Christ et al.

[11] Patent Number: 4,483,032

[45] Date of Patent: Nov. 20, 1984

[54] PROCESS FOR TREATING TEXTILE MATERIAL IN JET DYEING MACHINES

[75] Inventors: Wilhelm Christ, Michelbach; Hans-Ulrich von der Eltz, Frankfurt am Main; Albert Reuther, Bad Soden am Taunus, all of Fed. Rep. of Germany

[73] Assignee: Hoechst Aktiengesellschaft, Frankfurt am Main, Fed. Rep. of Germany

[21] Appl. No.: 436,048

[22] Filed: Oct. 22, 1982

[30] Foreign Application Priority Data

Oct. 24, 1981 [DE] Fed. Rep. of Germany ....... 3142200

[51] Int. Cl.³ .............................................. D06B 3/28
[52] U.S. Cl. .................................... 8/149.1; 8/149.2; 8/149.3; 68/5 C; 68/178
[58] Field of Search ................... 8/149.1, 149.2, 149.3, 8/152; 68/5 C, 177, 178

[56] References Cited

U.S. PATENT DOCUMENTS

| | | | |
|---|---|---|---|
| 1,948,568 | 2/1934 | Faber et al. | 68/5 C X |
| 3,921,420 | 11/1975 | Aurich et al. | 68/5 C |
| 3,949,575 | 4/1976 | Turner et al. | 68/5 C |
| 4,351,076 | 9/1982 | von der Eltz et al. | 8/149.1 |

*Primary Examiner*—Philip R. Coe
*Attorney, Agent, or Firm*—Curtis, Morris & Safford

[57] ABSTRACT

Inventive considerations have shown that the use of shorter liquid ratios can be realized in the course of wet-treating textile ropes in jet dyeing machines if the textile goods are driven by means of a non-inert gas stream and the dyestuff or product formulations necessary for carrying out the type of treatment desired are brought into contact with the goods by atomization into the circulated gaseous driving agent.

14 Claims, 1 Drawing Figure

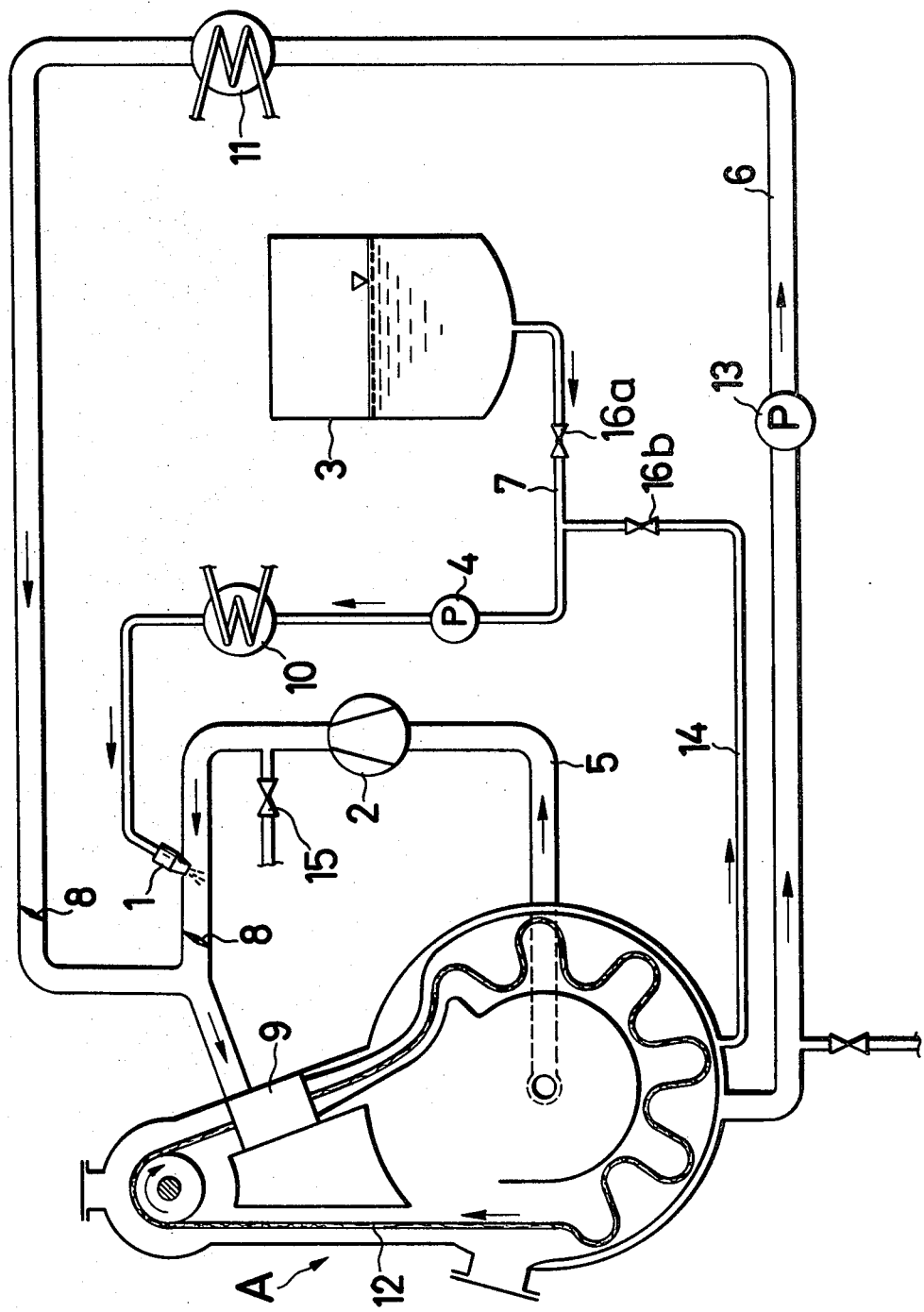

PROCESS FOR TREATING TEXTILE MATERIAL IN JET DYEING MACHINES

The present invention relates to the discontinuous or continuous wet treatment of textile material of synthetic or natural fibers or of mixtures of such fibers in rope form with dyestuffs suitable for the particular fiber type by the exhaust method or with other textile-finishing products on jet dyeing machines, in which the goods are propelled via a jet system by means of a circulated gas stream.

In commercially proven processes for wet-treating fabric ropes circulating in endless form on jet piece dyeing machines the transport of the textile material, in line with hitherto customary habits, is tied to the presence of treatment liquid (liquor) in the storage box, the circulation system and the jet, since the movement of the goods is effected by the flow of the liquor to the jet, and the treatment bath already contains the products necessary for the finishing process. This hydraulic transport of goods necessarily results in a liquor ratio of 6:1 to 8:1. Moreover, in these conventional processes the goods can of course only be heated up via the liquor itself.

U.S. Pat. Nos. 3,921,420 and 3,949,575 have moreover disclosed more recent processes, in the same field, in which the goods are transported, for their circulation, by means of the drive energy of a streaming inert gas. In these cases the particular feature of the inert gas is that it does not change the application properties of treatment liquor and treatment goods, i.e. only cold gases are suitable for the task intended, since at any elevated temperature the gas can no longer be inert within the meaning of the above definition. The result is that the processes of these two U.S. patents split in principle into an application phase in which the treatment liquor is applied in an inactive state (i.e. as a rule, cold) to the treatment goods and into a fixing phase in which the temperature conditions on the goods and in the liquor are changed by passing steam, or heat energy in another form, into the storage box of the jet machine. At this point it must be stated expressly that this change is not effected via the inert gas stream. The drive gas itself is heated —if at all —indirectly by the liquor being heated, but not actively used in a controlled manner specifically for heating the system.

The process of U.S. Pat. No. 3,949,575 differs only insignificantly from the hitherto customary jet processes in that the treatment liquor is initially introduced into the storage box, taken up by the goods and circulated with the goods (in them). Excess liquor is continually introduced into the inert gas stream, and losses of liquor are avoided by this recycling.

The working technique of U.S. Pat. No. 3,921,420 is in this respect more advanced, and applies the entire treatment liquor to the treatment goods by metering the liquor into the driving and cold inert gas stream.

According to these two U.S. patents, a thorough distribution of the treatment liquor is obtained during the application phase, even in a non-migrating system (i.e. where the entire treatment liquor is contained in the treatment goods, that is without excess liquor draining from the goods). This even distribution is required as a prerequisite for the fixing phase, since it is assumed that unevenly distributed treatment agents are also unevenly fixed in the fixing phase.

The published European Patent Application No. 0,014,919 further discloses an isothermal treatment process in which hot prewarmed treatment goods are brought into contact, in a jet machine, with hot treatment liquor, one part of the treatment liquor being fed to the storage box space and the other part being fed to the jet nozzle and the goods being driven either by a gas or by liquid (i.e. the liquor) or jointly by both. In this process, the treatment liquor is made up in a customary manner and using the customary concentration conditions of the treatment agents (dyestuffs and chemicals).

However, none of the known processes described above represents the desirable optimum. The processes of the U.S. patents suffer from the disadvantage that due to two stages being used longer treatment times are necessary than in the case of normal procedures where only the liquor acts as a driving force. Also, the pure inert gas stream drive and the circulation of excess liquor necessitate special machine measures which complicate the total concept of jet machines of this type.

The process of the European application necessarily arrives again in the liquor ratio range of 6:1-8:1 and therefore requires large amounts of heat energy to heat up these liquor quantities to the temperatures necessary.

All the processes of the prior art discussed above have in common that they can only be carried out in a discontinuous manner, i.e. with the treatment goods divided into single lots.

The present invention, then, has the object of developing a novel short liquor technique for jet dyeing machines which, compared to the procedure established in practice, is designed for the use of still shorter liquor ratios in order to take into account the necessity of saving time, energy and water, and where a continuous procedure should also be possible. The liquor ratio aimed at should be 3:1 or less than 3:1. In addition, it should be possible to use all temperature ranges, and although the isothermal procedure will be of prime importance, there should also exist the option of planned changes of the treatment temperature.

This object is achieved according to the invention if the textile goods are driven by a gas stream which is non-inert in respect of the intended specific treatment effect and, at the same time, the treatment agents or treatment agent formulations are added in an atomized form (if appropriate in the form of a mist or dust) to this gas stream in the jet section for the goods drive and are thus brought into contact with the textile goods and allowed to act there corresponding to the preselected temperature and pressure conditions.

In the course of carrying out the new procedure, it is advantageously also possible to treat an endless fabric rope in a circulating discontinuous manner or a fabric rope which is not tied together at the ends, thus not being closed in itself, during its passage in a continuous manner, possibly in a plurality of machine units arranged in succession.

A gas stream which is non-inert from a processing point of view is as a rule understood as meaning, within the scope of the present invention, a steam or hot air stream. However, in the process claimed mixtures of steam and air or other gases or vapors are also possible. The temperature range embraced in this process depends on the nature of the textile material and on the treatment process to be carried out and is between 30° C. and 140° C. and is set by a particular choice in respect of the nature of the gas stream and, possibly, by mixing warm and relatively cold components. This makes it possible, if required by the process, to increase or decrease the temperature after the contact phase between treatment agent and treatment goods in a continuous or stepped manner.

According to the process the advance of the goods can additionally be supported mechanically by a driven deflection roll.

The treatment agent can be added to the driving gas stream by means of nozzles or some other atomizing device.

In the discontinuous procedure the time of addition advantageously extends over several passes. In continuous processes, the metering-in is carried out in such a way that the desired application level is present on the treatment goods at the outlet of the (if appropriate: particular) machine.

The treatment agent is advantageously used in the form of a liquid formulation, for example as an aqueous dispersion or aqueous solution. The temperature of these formulations depends on the requirements of the process, of treatment agent and of treatment goods (range: 30° C. -140° C.).

Any material which imparts to the treatment goods certain intended properties is to be considered a treatment agent. To be mentioned in particular are dyestuffs, chemicals, auxiliaries, such as, for example, detergents, finishing agents or permanent-finishing agents, but the non-inert gas stream itself can also be considered such a treatment agent, since it is able to trigger, for example, a shrinkage process.

It is also possible to apply several different treatment agents in succession or mixed with one another.

An illustrative example of a jet dyeing machine used according to the invention is shown schematically, in cross-section, in the drawing below. The reference numerals used in the drawing have the following meaning:

A = jet dyeing machine comprised of drive unit and storage box space (not labeled with numerals)
1 = injection nozzle
2 = blower
3 = make-up vessel for treatment liquids
4 = pump in injection pipe (7)
5 = gas stream pipe
6 = liquor pipe containing pump (13)
7 = injection pipe containing pump (4)
8 = regulating valves
9 = jet drive device (jet nozzle, for example according to the Venturi principle)
10 = heat exchanger in injection pipe (7)
11 = heat exchanger in liquor pipe (6)
12 = treatment goods/fabric rope
13 = pump in liquor pipe (6)
14 = return pipe for excess liquor
15 = steam or air supply
16 = valves (a) and (b)

In this figure, the part of the jet dyeing machine labeled with the letter A is largely identical to the prototype of such a device as described in detail in U.S. Pat. No. 3,949,575.

This schematic illustration of a jet piece dyeing machine is intended to illustrate the process according to the invention but not to restrict it in any way.

In carrying out the process according to the invention, the made-up dyestuff or product liquor, which is prepared in vessel 3 (liquor make-up vessel) and standardized, flows from the injection nozzle 1 into the circulating gas stream, which is generated, in pipe 5, by the blower 2. The treatment liquid is atomized when the liquor batch leaves the injection nozzle (1), and is taken up by the gaseous treatment medium, which acts as a carrier or vector.

The atomized liquid is distributed within the treatment goods 12 predominantly in the zone of the jet 9. This distribution, which is intended to coalesce the liquid droplets in the goods, is continually supported, when the textile material is circulated in the form of a rope, by the motion of the goods and the resulting fulling work.

From a certain degree of liquor uptake onwards it is impossible to prevent liquid dripping from the treatment goods, particularly since even the rope layers present in the storage box exert, by their weight, a pressure which, as it were, squeezes the liquid out of the textile material. This fraction of excess liquor, which is not held by the goods 12, is thus available as a liquor feed for further cycles.

To be able to exhaust even this fraction of liquid, the fraction of liquid is sucked up by the injection pump 4 after the entire batch of liquor has been applied to the circulating fabric rope and is passed back in atomized form via the nozzle 1 for recirculation into the non-inert gas stream circulated in pipe 5. This circulation of liquid and the atomizing step are then maintained until the bath is exhausted. The result achieved hereby is that the liquor load of the textile goods 12 is maintained at a uniform level for distributing and fixing the dyestuff. Owing to the liquor circulation described it is also possible to meter into, for example, a dyeing system various products, depending on the process, in succession at intervals without impairing the levelness of the treatment agent thus applied. Another way of carrying out the process is in this respect that the excess liquor is resupplied to the jet nozzle 9 via pipe 6 and pump 13. The positions 13, 6 and 11 are for operating the jet machine under conventional conditions (pure liquid-drive).

Since the gas stream, for example steam, is the carrier of the atomized liquid, the state parameters pressure and gas temperature and the temperature of the atomized liquor must be regulated. The temperature of the steam is reduced by the contact of the steam, superheated due to the compression in the blower 2, with the atomized liquor because of partial evaporation of liquid at the surface of the droplets. The continual heating-up of the gas/liquor circulated system to the fixing temperature of the dyestuff is a function of the compression in the blower 2, the temperature of the injected liquor and the vapor pressure. To obtain the temperature of fixation the work of compression, the temperature of the liquor and the vapor pressure are maintained at constant preset values.

Owing to the thorough agitation of the gas stream which, in the jet 9, impinges on the good 12, a rapid heating-up of the treatment goods is obtained even given the possibility that air inclusions may still be present in the treatment goods initially. The maximum time for a temperature increase from 80° to 135° C. is about 7.5 minutes. In the goods themselves the temperature difference during the heating-up by the gas stream is considerably smaller than in the case of a heating-up via the liquor, since the temperature difference of the liquor depends on the heating-up gradient and on the number of bath reversals/minute.

If it is desired to cool down the circulating treatment medium, this is effected by cooling the injected liquor and/or by reducing the vapor pressure within the machine. If the treatment liquor is cooled down to values below 100° C., the pressure of the blower 2 necessary for the transport of the goods is effected by a supply of heated air. It is thus possible to carry out aftertreatments also in a gas stream, and even the subsequent rinsing can be carried out in a stream of humid air. To increase the amount of rinsing water injected a second injection nozzle, which is designed for a greater range of quantities, is additionally connected on if appropriate. There is also the possibility of replenishing the water in the storage space of A directly, with the leveling-out of concentration being accelerated via the portion of water present in rope 12.

If steam is used as the propellent gas in the course of the processing technique described, an even wetting and deaerating of the textile goods 12 can advantageously be achieved even before the treatment agent is added to the goods, because the treatment agent dispersed in the steam stream impinges with a high velocity, i.e. with great penetrating force, on the goods in the expansion of the steam jet.

The running speed of the goods which can be obtained with the aid of a gas stream is higher than in the case of the pushing action through liquor flow, since the resulting relative velocity between goods and gas is considerably greater than that which results between goods and liquor. The very low air content in the system means that the addition of defoamer which is necessary in conventional processes on partially flooded jet dyeing machines is not required. Also, the treatment of the product by the gas stream leads to a considerably better opening-up of the rope, which, compared to the drive of the rope by liquor movement in accordance with the known procedure, contributes to avoiding creases.

The new treatment technique produces favorable results even in processes which come into consideration merely for preparing the goods or the aftertreatment, i.e. treatment steps which are known under the term "washing" or assist the triggering of shrinkage. The procedure claimed can also be used in processes for the alkalinization of polyester fiber or filament textile material.

The liquor ratio which becomes established in the wet treatment according to the invention depends on the liquor uptake of the textile material and on the amount of made-up liquor envisaged for each particular treatment stage.

The liquor ratio which can be achieved will be illustrated below by a numerical example:

If a specific weight of 0.4 g/cm³ is assumed for knitted polyester (PES) goods, the resulting maximum liquor uptake for 100 kg of original weight per storage box is as follows:

| total volume of the knitted PES goods | = 100.000/0.4 | = 250.00 liters |
| air volume displaced by PES | = 100/1.38 | = 72.46 liters |
| theoretically free space corresponds to the maximum liquor uptake | = 250−72.46 | = 177.54 liters |

Given a liquor uptake of 100%, the liquor ratio is thus 1.78:1. If the excess liquor is assumed to amount to 50 liters, then the overall liquor ratio is 2.28:1. This low liquor ratio results in a considerable saving in thermal energy and in the consumption of chemicals and textile auxiliaries.

As far as the realizability of the present invention is concerned, it was hitherto thought impossible, and was therefore surprising, that a level and uniform fixation of the treatment agents can be achieved in an isothermal process on the basis of the special measures typical of the process. Practical experience and theoretical considerations argued especially against such a result, isothermal conditions, in which treatment agents and treatment goods are in optimal uptake and fixation states with respect to one another, immediately fixing every uneven distribution during exhaustion and making it visible, for example in dyeing, as unlevelness. This behavior is also known from other sources: thus, for example, the two processes of the U.S. patents mentioned in the state of the art point out this objection because they are carried out in two stages (application phase + a separate fixing phase). According to all that was said above, an expert had therefore to overcome a serious prejudice in order to consider, and test, the new processing technique.

The process according to the invention generally proceeds in principle as follows:

The jet machine A is loaded with the treatment goods 12 (even this can be carried out by drawing the goods into the jet by means of the non-inert gas stream), whereupon these are set in motion—generally in circulation—by contact with the non-inert gas stream, which is supplied via the pipe 15 and forced into the actual treatment zone by the jet system 9. This non-inert gas stream is as a rule steam of a certain temperature. The result is that the treatment goods are simultaneously (a) heated and (b) thoroughly wetted throughout. The optimum in the preparation of the goods, and the preset treatment temperature, are already reached after a short time—depending on the treatment goods, the heating and wetting takes 7 to 10 minutes.

In the meantime, separately therefrom, the treatment agents have as a rule been brought into an aqueous formulation form, which has also been heated to the treatment temperature.

This liquid formulation is then metered first via the injection nozzle 1 into the non-inert gas stream circulating in pipe 5 and then, together with the gaseous carrier, via the jet system 9 into the path (treatment zone) of the circulating fabric rope 12; this latter step is best carried out in such a way that several cycles of the treatment goods take place during the metering-in phase. After the injection process has ended, the textile rope 12 is further treated for a certain time, i.e. circulation of the textile rope is continued for the time being under the influence of the streaming non-inert gas. Any treatment liquor draining from the treatment goods during this time is collected under the sliding bars (not shown) of the jet machine A and returned to the gas stream in pipe 5 via pipe 14, injection pump 4 and nozzle 1. This recycling effects complete utilization of even these parts of the liquor. When, for example, dyeing PES fabrics the total time to be allowed for the injection period of the liquor is 5 to 10 minutes and for the subsequent running time, depending on the depth of dyeing, a further 10 to 30 minutes, so that a pure dyeing time of about 40 minutes can be budgeted for. Owing to the fact that, in addition, only short liquor conditions are given, the saving in time and energy by the measures according to the invention is considerable.

The new process also contains many possibilities for variation: thus, for example, altering the composition of the driving non-inert gas stream makes it possible in the finishing process to go from one isothermal stage into another isothermal stage.

Further, depending on the requirements it is possible to switch between driving using either non-inert gas or liquid. The jet machine can be flooded in one go or partially, which feature can be necessary for rinsing and washing processes either after or for preparing other finishing processes.

It is also possible to join up isothermal treatment stages with non-isothermal treatment stages, and to carry out such treatment stages in any particular order, a gradual transition being just as possible as an abrupt transition.

The examples which follow serve to illustrate the invention in more detail; a dyeing jet of the type shown in the FIGURE was used for the processing measures corresponding to the illustrative embodiments:

EXAMPLE 1

100 kg of dry knitwear made of texturized polyester filament material were introduced in rope form into a jet dyeing machine, the goods being transported by means of a stream of hot air from the jet system (generated by a blower) as well as mechanical support by a driven roll.

After the loading step was complete, the textile material was sewn together in such a way that an endless fabric rope was formed. The inlet opening of the dyeing jet was then sealed, and the textile material was again set in circulation using a further stream of hot air (conditions as above). Steam was then supplied to the delivery side of the running blower and passed into the dyeing machine via the jet section. The condensate obtained in this step in the lower part of the dyeing vessel was collected for further use, the machine being evacuated at the same time. The presence of the steam then increased the temperature of the circulating textile material to about that of the injected steam, and the dyeing vessel itself filled up with steam of the same temperature. When the final temperature of 130° C. was reached, the steam supply was switched off while the steam circulation was maintained.

After this treatment for heating up the textile material, 150 liters of an aqueous and hot treatment liquor at 85° C. which contained—relative to the proposed total amount of liquor of the dyebath —2 g/liter of a leveling auxiliary based on a high molecular weight sulfo-containing polyester and 1.5 g/liter of sodium acetate and acetic acid for adjusting the pH value to 4.5 were metered in from a make-up vessel into the circulated steam stream via an injection pump. The rate of injection in this step was adjusted in such a way that the supply of the total liquor batch, by atomizing in the injection nozzle, was distributed over 5 passes of the goods. The excess portion of the liquor, not bound by the goods, was kept in circulation by the injection pump and the jet system, a heat exchanger downstream of this pump adjusting the temperature of the liquor to 130° C. and maintaining it at this constant value.

After a treatment time of 5 minutes 140 liters of an aqueous hot dyeing liquor at 85° C. which—relative to the weight of the goods—contained 0.25% of the disperse dyestuff of the formula

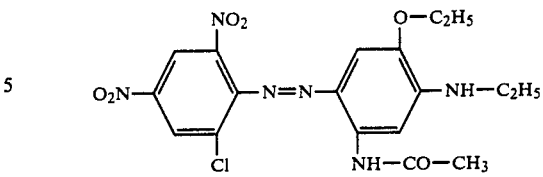

in the form of an aqueous dispersion were metered into the steam stream via the injection pump and atomized in the jet section. The injection of this amount of liquor was distributed over the course of 10 passes of the goods, and the circulation of the excess and non-absorbed total liquor was continued at the preselected dyeing temperature until the dyebath was exhausted, in this case for 20 minutes.

The circulating liquor was finally cooled down to 85° C. at a rate of 1.5° C./min. by the heat exchanger, the steam stream being replaced from a temperature of 110° C. onwards by a steam/air mixture resulting from the admixing of hot air. The amounts of sodium hydroxide solution, hydrosulfite and auxiliary customary for the reductive clearing of the goods thus dyed were then added, dissolved in 500 liters of water, to the circulation via the injection pump. This liquor was dropped again after a running time of about 10 minutes and after cooling down to 60° C., and the aftertreatment of the dyeing was completed by rinsing with warm (50° C.) and cold water.

A perfectly level blue dyeing was obtained on the knitwear.

EXAMPLE 2

100 kg of dry polyester/viscose staple blend fabric were introduced in rope form into a jet dyeing machine, the goods being transported by a steam stream from the jet system with the aid of a blower and by means of mechanical assistance from a driven roll.

After the loading step was complete, the fiber material was sewn together in such a way that an endless rope of fabric was formed. The inlet opening of the dyeing machine was then sealed, and the textile material was again set in circulation by switching on the blower again and supplying further steam. The presence of the steam increased the temperature of the goods. When a temperature of 110° C. was reached, 150 liters of an aqueous and hot treatment liquor at 85° C. which contained—relative to the envisaged total amount of liquor in the dyebath —1.5 g/liter of an auxiliary based on highly polymerized and sulfo-containing polyester and 1.5 g/liter of sodium acetate and acetic acid for adjusting the pH value to 4.5 were then metered from a make-up vessel via an injection pump into the circulated steam stream. The rate of injection in this step was adjusted in such a way that the supply of this liquor batch was, by atomizing in the jet section, distributed over 5 passes of the goods, and the excess part of the liquor, not taken up by the textile material, was kept in circulation at 110° C. for a further 5 minutes.

After this treatment time 140 liters of an aqueous and hot dyeing liquor at 80° C. which contained —relative to the weight of the goods —0.4% of the disperse dyestuff of the formula

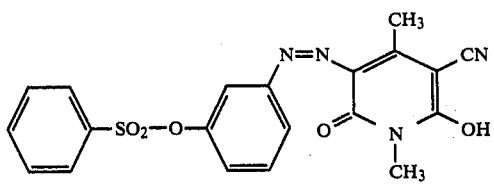

and 0.33% of the disperse dyestuff of the formula

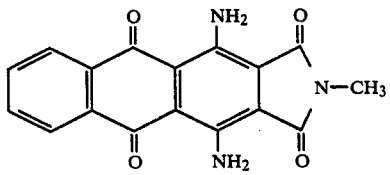

in the form of an aqueous dispersion, were metered via the injection pump into the streaming steam. The time taken for atomizing the liquor was distributed evenly over the period in which the dyeing temperature was increased to 130° C. by further addition of steam. The excess part of the non-bonded total liquor was then kept in circulation by continuous atomizing and the dyeing process was then continued at 130° C. for about a further 20 minutes, until the dyebath was exhausted. The circulating liquor was then cooled down to 85° C. via a heat exchanger, a steam/air mixture forming from a temperature of 110° C. onwards by the admixture of compressed air. The rinsing process for the polyester dyeing was finally started by passing in warm water of about 60° C. from the make-up vessel via the injection pump and was completed by the change of bath effected in this manner together with falling temperature.

For dyeing the viscose part of the blend fabric in a second phase the goods were driven with 0.25 bar overpressure, generated by the blower, via a heated air stream from the jet system and, again, with the assistance of the driven roll. A temperature of the goods of about 40° C. was set at the same time in this step.

150 liters of an aqueous pre-run liquor which had been prepared in the make-up vessel, also had a temperature of about 40° C. and contained—relative to the envisaged total amount of the liquor of the dyebath —15 g/liter of anhydrous sodium carbonate and 50 g/liter of anhydrous sodium sulfate were distributed at this temperature over 10 passes of the goods by atomizing and applied to the textile goods by recirculation of the liquor excess. This was followed, over 15 minutes, under the same conditions and in an analogous manner, by the addition of an aqueous reactive dyestuff solution, in an amount of 150 liters, which contained —relative to the weight of the goods —1.4% of the reactive dyestuff of the formula

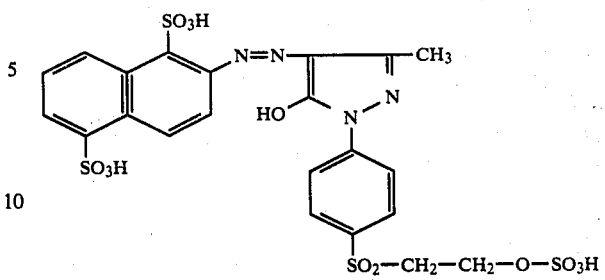

and 0.8% of the reactive dyestuff of the formula

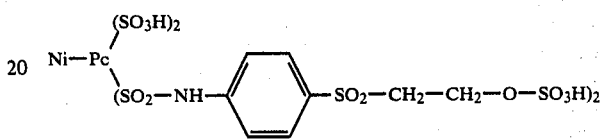

(Ni—Pc = nickel phthalocyanine)

The dyeing temperature was then increased to 80° C. within 30 minutes by adding steam into the hot air stream, and the circulating textile goods were left at this temperature for 60 minutes. The aftertreatment of the dyeing by means of passing rinsing water into the dyeing machine, associated with a subsequent neutralizing and soaping bath, was carried out as in the customary procedure.

A level green dyeing was obtained on the polyester/viscose staple blend fabric.

EXAMPLE 3

To obtain a silk finish, 70 kg of dry knitwear made of polyester fiber material were entered in rope form with the aid of a steam stream into a jet dyeing machine, and the textile goods were set in circulation as in the description of Example 2. When the goods had reached a temperature of 110° C., 200 liters of an aqueous liquor which contained 20 g/liter of sodium hydroxide were applied to the fabric rope via the injection nozzle system and allowed to act there for a period of 20 minutes with continuing recirculation of the excess amount of liquor. The treatment bath was then cooled to about 80° C., as in Example 2, and the aftertreatment was carried out by injection of rinsing liquor into the circulation and neutralization of the goods, associated—as customary —with a resulting change of bath and simultaneously falling temperature.

The polyester goods produced were obtained with a silk-like handle.

EXAMPLE 4

100 kg of dry knitted goods (in rope form) made of a cotton fiber material were introduced into a jet dyeing machine and set in circulation as in the description of Example 2 by applying streaming steam. As soon as the temperature of the goods had reached 100° C., 250 liters of an aqueous liquor of 85° C. which contained—relative to the weight of the goods—2% of the vat dyestuff Vat Brown 45 with the C.I. No. 59,500 in the form of an aqueous dispersion were distributed by the injection nozzle system onto the circulating fabric rope and allowed to act there for 15 minutes with continuing recirculation of the excess liquor. 100 liters of an aqueous liquor (85° C.) which contained 18 cm³/liter of 38° Be (=32.5% strength) sodium hydroxide solution and 8 g/liter of a stabilized sulfoxylate as a reducing agent were metered into the circulated treatment agent in the course of 10 minutes. The dyeing temperature was then increased to 115° C. by a further addition of steam to the delivery side of the blower and the goods were then dyed at this temperature for a further 40 minutes. The bath was then cooled down to 70° C. via the heat exchanger, nitrogen being admixed to the circulating steam stream from a temperature of 110° C. onwards. An aqueous solution of 1.5 g/liter of hydrosulfite, to stabilize the vat state, was then metered in at a temperature of about 70° C., and the textile goods were treated for a further 10 minutes under these conditions. The dyeing was finally finished by rinsing, oxidizing and soaping, as customary in vat dyeings.

A level brown dyeing was obtained on the cotton.

EXAMPLE 5

The dyeing operation was carried out using 70 kg of bleached knitted cotton goods (in rope form) which were moist from hydro-extracting; to carry out the dyeing operation, the description of Example 2 was followed, i.e. the goods were driven, in this case also, by the impinging steam stream. 200 liters of a separately made-up liquor which contained—relative to the weight of the goods—a solution in hot water at 60° C. of 1.5% of anhydrous sodium carbonate and 3% of the dyestuff Direct Yellow 28 with the C.I. No. 19,555 were metered under these conditions at a temperature of 60° C. into the streaming steam. This liquor was atomized in the course of 10 passes of the goods, and the temperature of the treatment medium was then increased to 100° C. in the course of 20 minutes and under continuing recirculation of the liquor not bound by the textile material, by the supply of steam. After a further 10 minutes 100 liters of a separately prepared aqueous liquor of 85° C. which contained—relative to the envisaged total amount of liquor of the dyebath—10% of anhydrous sodium sulfate were then metered in the course of 10 minutes into the circulating fiber material, which was then dyed for a further 20 minutes. The circulated liquor was then cooled down via a heat exchanger, and the dyeing was then finished, as in Example 2, by injecting rinsing baths and aftertreatment baths.

A level yellow dyeing was obtained on the knitted cotton goods.

EXAMPLE 6

100 kg of woven goods (in rope form) made of polyacrylonitrile fibers were used to prepare a dyeing as in Example 2. In this operation, 150 liters of a separately made-up liquor which contained—relative to the weight of the goods—as a solution in water of 80° C. 5% of anhydrous sodium sulfate, 0.5% of a retarder based on 50% by weight of the reaction product of 1 mole of stearylamine with 3 moles of ethylene oxide, 2% of crystalline sodium acetate and 1.5% of acetic acid (60% strength) were metered at a temperature of 80° C. into the textile material, which was being agitated with the aid of streaming steam. This liquor was atomized in the course of 10 passes of the goods, and 100 liters of a hot and aqueous dyeing liquor of 80° C. which contained—relative to the weight of the goods —3% of the basic dyestuff of the formula

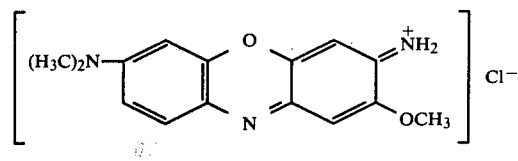

in a dissolved form were then applied to the circulating fabric rope in the course of 10 minutes. The temperature of the dyebath was then increased, while the excess liquor was recirculated, in the course of 15 minutes to 103° C. by the supply of steam, and the textile goods were then exposed under these conditions to the action of the treatment agent until the dyebath was exhausted. The after-treatment of the goods thus dyed comprised cooling down the circulated liquor and injecting treatment baths customary for dyeings with cationic dyestuffs.

A level dark blue dyeing was obtained on the woven polyacrylonitrile goods.

EXAMPLE 7

120 kg of bleached knitted goods made of cotton fibers were introduced in rope form into a jet dyeing machine, the goods being transported by a stream of warm air generated in the jet system via a blower with an overpressure of 0.25 bar. The temperature of the endless circulating fabric rope was thus increased to 60° C. by the hot air stream. 200 liters of an aqueous liquor of 50° C. which contained—relative to the envisaged total amount of liquor of the dyeing (350 liters) —0.5 g/liter of sodium diisobutylnaphthalene sulfonate, 1 g/liter of anhydrous sodium carbonate, 1 g/liter of sodium 2,2'-dinaphthylmethane-6,6'-disulfonate and 0.5 g/liter of the leuco vat ester dyestuff Solubilised Vat Brown 1 with the C.I. No. 70,801 in dissolved form were then injected into the circulated driving medium and the dyestuff formulation was brought in this form into contact with the textile goods. After a pre-run time of 10 minutes a further bath, which contained 25 g/liter of anhydrous sodium sulfate and 0.5 g/liter of sodium nitrite as a solution in 100 liters of water of 50° C. was distributed uniformly over the circulating fabric rope. This distribution took place in the course of 10 minutes, during which the excess liquor not absorbed by the fiber material was recirculated. This step was followed by a cooling down of the treatment agent with the aid of a heat exchanger in the course of 30 minutes to a liquor temperature of 70° C.

5 cm³/liter of sulfuric acid (96% strength) diluted with 50 liters of water, were then applied at 30° C. in the course of 15 minutes evenly to the goods by atomizing and the goods were treated under these conditions for a further 10 minutes. The aftertreatment customary for dyeings with Leuco vat ester dyestuffs was then carried out.

A level brown dyeing was obtained on the knitted cotton goods.

We claim:

1. In a process for the discontinuous or continuous wet treatment of textile material of synthetic or natural fibers or of mixtures of such fibers in rope form with dyestuffs suitable for the particular fiber type by the exhaust method or with other textile-finishing products on jet dyeing machines, in which the goods are propelled via a jet system by means of a circulated gas stream, the improvement wherein the textile goods are driven by a gas stream which is non-inert in respect of the intended specific treatment effect and, at the same time, the treatment agents or treatment agent formulations are added in an atomized form to this gas stream in the jet section for the goods drive and are thus brought into contact with the textile goods and allowed to act there corresponding to the preselected temperature and pressure conditions.

2. The process as claimed in claim 1, wherein the non-inert gas stream is a steam stream.

3. The process as claimed in claim 1, wherein the non-inert gas stream is hot air.

4. The process as claimed in claim 1, wherein the non-inert gas stream is a hot gas other than steam or hot air.

5. The process as claimed in claim 1, wherein the non-inert gas stream is a mixture of gases.

6. The process as claimed in claim 1, wherein the non-inert gas stream is a mixture of steam and air.

7. The process as claimed in claim 1, wherein the non-inert gas stream is hot or cold solvent vapor.

8. The process as claimed in claim 1, wherein the non-inert gas stream is mixed from hot and cold components to give the process temperature.

9. The process as claimed in claim 1, wherein the textile goods are treated under pure isothermal conditions.

10. The process as claimed in claim 1, wherein the textile goods are treated in several isothermal stages of different temperature.

11. The process as claimed in claim 1, wherein isothermal treatment stages are combined with non-isothermal treatment stages.

12. The process as claimed in claim 1, wherein the treatment temperature is controlled solely via the non-inert gas.

13. The process as claimed in claim 1, wherein the treatment temperature is controlled via the non-inert gas and the treatment agent.

14. The process as claimed in claim 1, wherein excess treatment agent condensing in the treatment vessel is returned to the jet section.

* * * * *